US006695499B2

(12) United States Patent
Bartolome et al.

(10) Patent No.: US 6,695,499 B2
(45) Date of Patent: Feb. 24, 2004

(54) BEAM FOR SUPPORTING A CARRIAGE

(75) Inventors: Jordi Bartolome, Barcelona (ES); Ignacio De Olazabal, Barcelona (ES); Joaquim Brugue, Barcelona (ES); Carles Viñas, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 22 days.

(21) Appl. No.: 09/932,989

(22) Filed: Aug. 21, 2001

(65) Prior Publication Data

US 2002/0034410 A1 Mar. 21, 2002

(30) Foreign Application Priority Data

Aug. 24, 2000 (EP) ........................................... 00118445

(51) Int. Cl.$^{7}$ ............................. B41J 11/22; H04N 1/04

(52) U.S. Cl. ....................... 400/354; 400/352; 358/494; 358/497

(58) Field of Search ................................ 400/283, 352, 400/354, 355, 356, 357, 358, 691, 693; 347/37, 39; 358/474, 494, 497

(56) References Cited

U.S. PATENT DOCUMENTS 5,455,607 A * 10/1995 Rhoads et al. ................. 347/8
5,459,325 A 10/1995 Hueton et al. ........... 250/458.1
5,669,724 A * 9/1997 Kato .......................... 400/605
5,696,541 A * 12/1997 Akahane et al. ............... 347/8
5,953,036 A 9/1999 Furlani et al. .............. 347/139
6,123,407 A * 9/2000 Muraki ........................ 347/24

FOREIGN PATENT DOCUMENTS

| | | | | |
|---|---|---|---|---|
| EP | 0540564 B1 | | 3/1996 | B41J/29/02 |
| EP | 0958923 | | 11/1999 | B41J/2/01 |
| EP | 1013457 | | 6/2000 | B41J/19/00 |
| EP | 1029696 | | 8/2000 | B41J/19/20 |
| JP | 2000094770 A | * | 4/2000 | B41J/13/02 |

OTHER PUBLICATIONS

Search Report for Corresponding European patent application No. 00118445.6.

* cited by examiner

*Primary Examiner*—Daniel J. Colilla

(57) ABSTRACT

A scanning device such as a printer has a trapezoidal carriage support beam which permits a compact juxtaposition of the carriage slider rod, the printhead, a drive belt and an encoder device. A second slider mounting for the printer carriage includes a bushing incorporating a part-spherical portion and an arm which engage with corresponding parts of the carriage.

26 Claims, 4 Drawing Sheets

BEAM FOR SUPPORTING A CARRIAGE

FIELD OF THE INVENTION

The present invention relates to a beam for supporting a sliding carriage as it moves relative to a medium to be scanned, for example in hardcopy apparatus such as a printer.

BACKGROUND OF THE INVENTION

In prior art printers, the beam for supporting the printhead-carrying carriage is a structural element which is required to provide rigidity for the printer. For this reason, such beams have a substantially rectangular cross-section which, in particular for sheet metal beams, provides the required degree of stiffness.

A problem with the rectangular cross-section is that it prevents various components being arranged relatively closely together which it would be desirable to achieve. In a printer, the relevant components are the slider rod, the printhead, the drive belt and/or the encoder device.

The present invention seeks to overcome or reduce the above problem.

SUMMARY OF THE INVENTION

According to the present invention, there is provided a scanning device comprising a structural beam supporting:

a) a guide member, b) a scanning head member moveably mounted on said guide member and moving parallel to a scanning plane (B), and further supporting:

c) a drive mechanism for moving the scanning head member, and/or d) an encoder device for determining the position of the scanning head member relative to the rest of the device, the beam having a plurality of faces including a first face, which is substantially parallel to the scanning plane (B), and an adjoining second face facing the guide member, in which the second face includes at least a first portion, which is closest to the guide member, and a second portion, which is set back from the first portion.

An advantage of the above device is that the drive mechanism and/or encoder device can be located in front of the second portion. This leads to an arrangement in which the various components mentioned can all be located close to the guide member. In particular it also provides a vertically compact arrangement. When the scanning device is a printer, it will be appreciated that the scanning plane corresponds to the plane in which the media advances.

In a preferred embodiment, the entire second face is inclined at an angle of 50° to the first face. This permits a convenient arrangement of components and means that the beam has a relatively-rigid cross-sectional shape.

Preferably, the beam has the cross-sectional shape of a trapezium. This is a particularly rigid shape. In addition with the first surface and an upper, parallel, third face being arranged generally horizontally, the third face can form a support for connecting cables or tubes to the scanning head member.

In a preferred embodiment a drive mechanism in the form of a drive belt is located between the encoder device and the second portion of the second face to constitute a particularly compact arrangement.

In preferred embodiments of the present invention the scanning head member of the scanning device has a separate support region incorporating a bushing for sliding on a second guide member of the structural beam, the bushing comprising a portion having a part-spherical surface, which engages and can rotate in a limited manner relative to a corresponding surface of the scanning head member, and a flexible arm extending from the bushing portion and attached to a formation on the scanning head member. It will be appreciated that this constitutes an independent aspect of the present invention.

According to another embodiment, the present invention pertains to a hardcopy apparatus including a structural beam having a first face and a second face. The first face is substantially parallel to a scanning plane, and the second face faces a guide member. The guide member is attached to the structural beam. A scanning head member is moveably mounted on the guide member and is operable to move parallel to the scanning plane. In addition, substantially all of the second face is inclined to the first face.

According to yet another embodiment, the present invention relates to a hardcopy apparatus including a structural beam having a first face and a second face. The first face is substantially parallel to a scanning plane, and the second face faces a guide member. The guide member is attached to the structural beam. A scanning head member is moveably mounted on the guide member and is operable to move parallel to the scanning plane. In addition, the hardcopy apparatus includes a drive mechanism for moving the scanning head member. The drive mechanism includes a drive belt arranged in front of the second face. The hardcopy apparatus further includes an encoder device for determining the position of the scanning head member relative to the structural beam, in which the encoder device is arranged in front of the second portion of the second face and in which at least part of the second face is inclined to the first face.

BRIEF DESCRIPTION OF THE DRAWINGS

Preferred embodiments of the present invention will now be described, by way of example only, with reference to the accompanying drawings, of which.

DETAILED DESCRIPTION OF PREFERRED EMBODIMENTS

Figure 1:
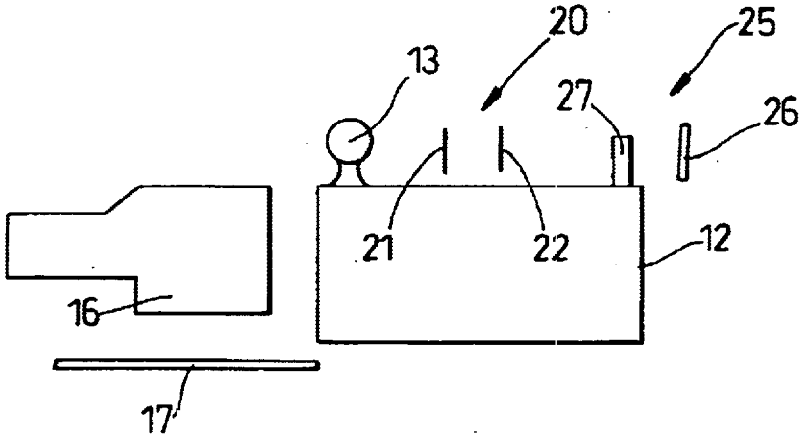
FIG. 1 is a schematic cross-sectional view of a prior art printer.

Referring to the drawings, FIG. 1 shows schematically the printing carriage beam 12 of a prior art printer. The beam is made of sheet metal or an aluminium extrusion, which are relatively inexpensive, and has a rectangular cross-section, which gives the beam rigidity. A slider rod 13, for supporting a printer carriage (not shown) is shown mounted on beam 12 adjacent to the top front corner thereof. The printer carriage carries a printhead 16 for printing on a print medium (not shown) over a platen 17.

The slider rod 13 is an accurately manufactured component of the printer and so printhead 16 should be located as close as possible to the slider rod to maintain accuracy in its position to ensure accurate dot placement and good print quality.

A drive belt mechanism is provided for moving the printer carriage in a reciprocating manner and comprises an endless reciprocating belt 20 with two runs 21, 22 one of which drivingly engages the carriage. This engagement produces relatively high drive forces since the printer carriage moves quickly and frequently reverses in direction. These drive forces are applied at a location spaced from both the frictional forces arising at the slider rod and the inertia forces associated with the center of gravity of the printer carriage. Thus the drive forces produce undesirable torque components and there is a tendency for them to produce rotational movements of the carriage about the slider rod 13. Accordingly the belt 20 should be arranged as close as possible to the center of gravity of the printer carriage and to the slider rod to minimise the torque produced.

An encoder device 25 is also provided for controlling and monitoring the position of the carriage along the slider rod 13. The device 25 comprises a length of tape 26 fixed to the printer and bearing closely-arranged vertical markings which are scanned by a sensor 27 mounted on the printer carriage. The signals detected by the sensor constantly determine the acceleration and deceleration movements of the printer carriage. Since, with a printing resolution of 2400 d.p.i., it is desirable to determine the position of the printhead to within 0.01 mm, the encoder device should be as close as possible to the printhead to ensure that its reading is as accurate as possible and is not falsified by any rotating or rocking movements of the carriage. Also, in case the slider rod 13 has deviations from straightness, any resulting changes in printer carriage speed need to be detected and remedied quickly.

Thus it will be noted that it is desirable to have the various printer components positioned closely together, but that the shape of beam 12 means that the components have to be located at positions around its periphery which do not have the desired proximity. Also, since some of the components are positioned above the beam 12, the printer has a considerable height. It is not possible to reduce the printer height by simply reducing the height of beam 12 because this would reduce the rigidity of the beam, which would lead to a deterioration in print quality.

Figure 2:
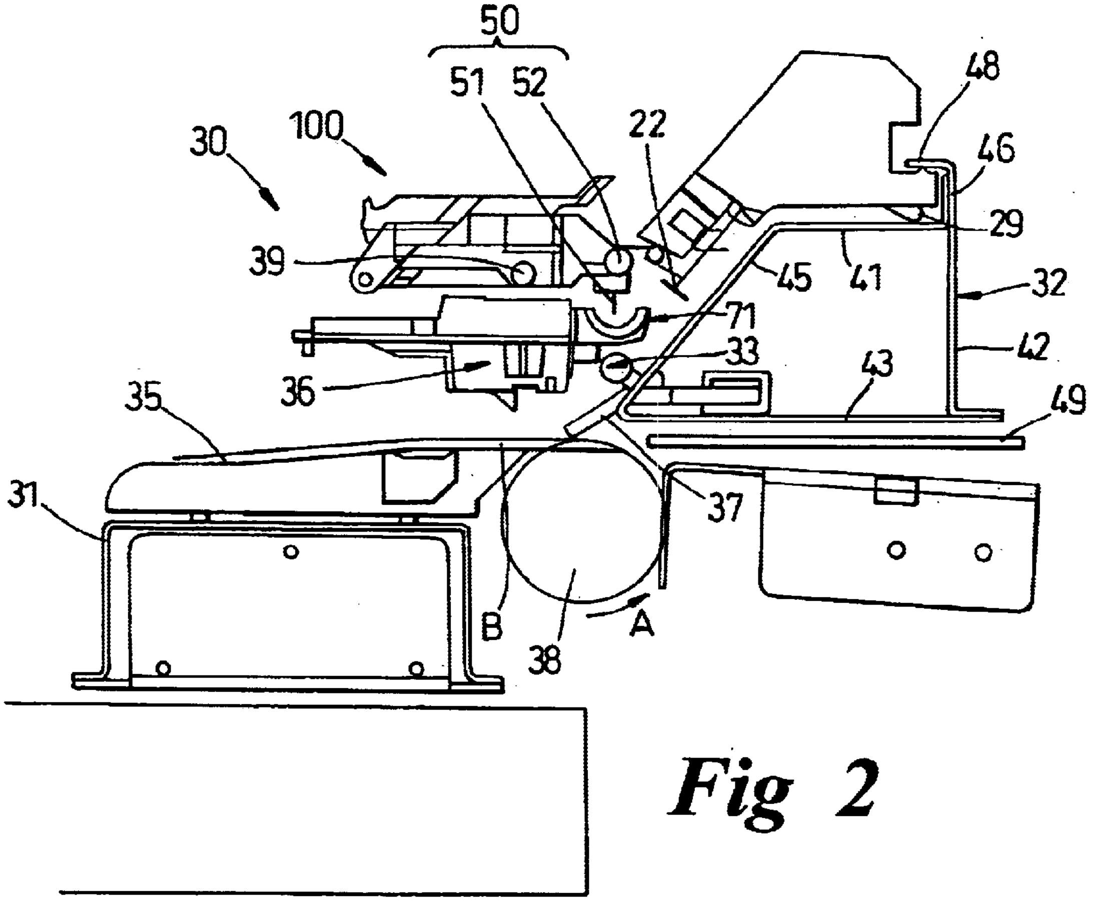
FIG. 2 is a cross-sectional view of a printer incorporating a printhead carriage device constituting a first embodiment.

Referring now to FIG. 2, a printer 30 in accordance with the present invention comprises structural beams 31 and 32. Beam 31 is a so-called vacuum beam constituting part of a hold down device to retain a print medium flat on a printing platen 35 defining a printing or scanning plane B underneath a printhead 36. A pinch system 37 and a drive roller 38 comprise parts of a drive system for advancing the print medium past the printhead 36. The printer carriage has a center of gravity 39.

The print medium may approach the printing platen 35 along a curved path indicated by arrow A around roller 38. Alternatively, a print medium 49, which may be of relatively stiff and/or thick material, may approach the printing platen 35 along a straight path extending from the rear of printer 30.

Beam 32 is a printer carriage beam made of sheet metal and corresponding to beam 12 of the printer of FIG. 1. It comprises top, rear and bottom walls 41, 42 and 43 but, instead of a vertical front wall, it has a sloping front wall 45 so that the beam has a trapezoidal cross-sectional shape. The angle between bottom wall 43 and front wall 45 is 50°. Attached to wall 45 adjacent to the bottom edge thereof is a slider rod 33 upon which slide one or more bearings (not shown) of a printer carriage 100. A further bearing of the carriage 100 engages a flange 48 on a vertical extension 46 of the rear wall 42 of the beam 32, the bearing being shown only schematically in FIG. 2 and being described below in more detail in connection with FIGS. 3 to 8.

The position of slider rod 33 is such as to allow the printhead 36 to travel at the desired spacing from platen 35, while being located relatively close to the slider rod.

An encoder device 50 is located above and close to the slider rod 33 and at a spacing from the front wall 45. The encoder device comprises a marked tape 51 extending along the scan axis of the printer and passing between the arms of a sensor 52 which travels with the printer carriage 100.

The two runs 71, 72 of a drive belt for the printer carriage 100 extend between the encoder device 50 and the front wall 45 of beam 32.

FIGS. 3 to 8 show a bushing 150 which has a top surface which slides along the bottom surface of flange 48, the bushing being urged against the flange by a spring 29 which engages the top wall 41 of beam 32. Bushing 150 is made of a resilient metal and comprises a slider body portion 151 arranged between two planar flexible arms 152, 153. The top surface 54 of portion 151 comprises four sliding surface regions 56, 57, 58, 59 arranged around a substantially central recess 60. In use, the regions 56-59 are arranged to slide on the bottom surface of flange 48; these regions are raised relative to areas 61, 62, which do not contact flange 16.

The lower surface of portion 151 comprises a part-spherical portion 65 which is truncated at the top, where it meets the surface 66 of portion 151 which is coplanar with the bottom surfaces of arms 152, 153. The center of curvature of the surface of portion 65 is located slightly above the sliding surface 54. Portion 65 is also truncated at its side surfaces 67, 68. Portion 65 is substantially centrally located on surface 66 and recess 60 extends into the interior thereof. The part-spherical surface of portion 65 is polished smooth.

A first arm 152 extends from one end of portion 151 and at its free end has an angled portion 78 terminating in an end portion 73 extending parallel to the major part of the arm and having an elongate hole 74 therein. A second arm 153 extends from the opposite end of portion 151 and at its free end has a hook-shaped portion 76.

Figure 3:
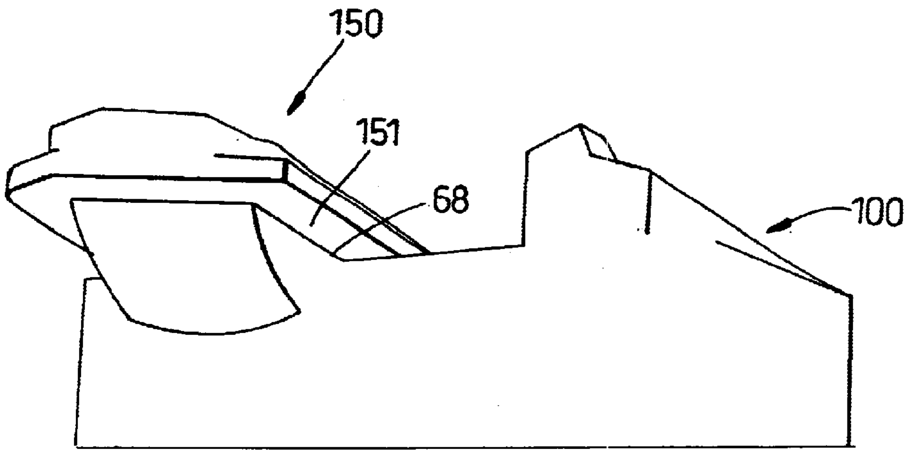
FIG. 3 shows a bottom perspective view, partly broken away, of a sliding arrangement provided at the right hand side of FIG. 2.
Figure 4:
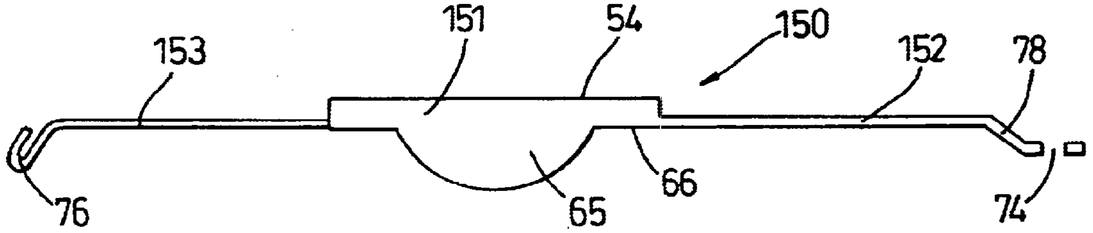
FIG. 4 shows a side sectional view of a bushing of the arrangement of FIG. 3.
Figure 5:
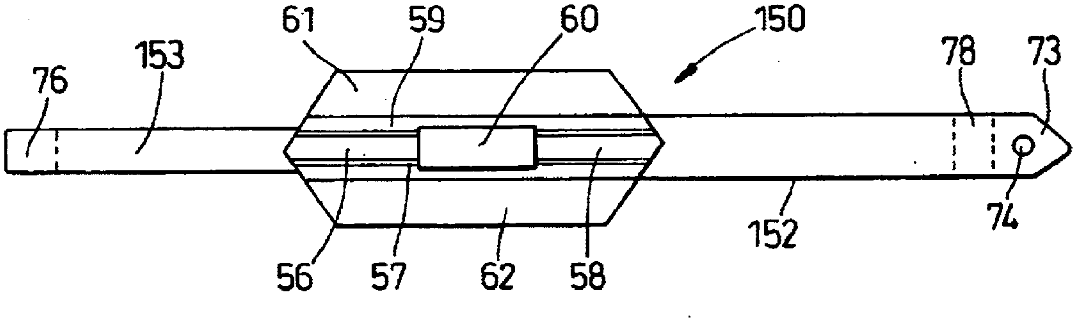
FIGS. 5 and 6 are top and bottom views respectively of the bushing of FIG. 3.
Figure 6:
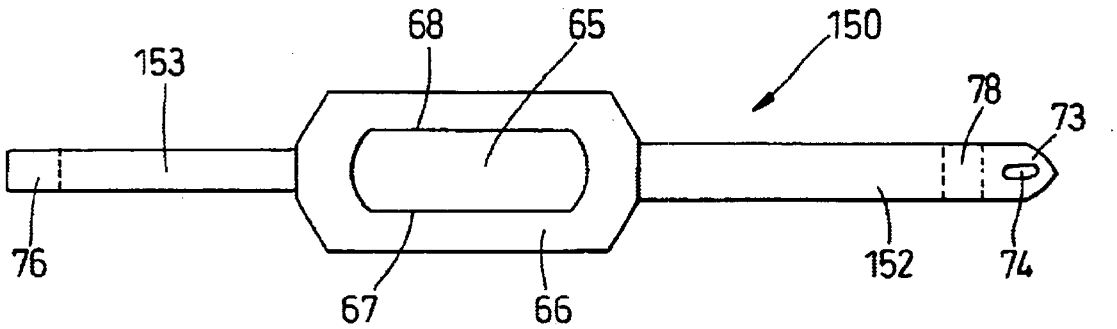
Figure 7:
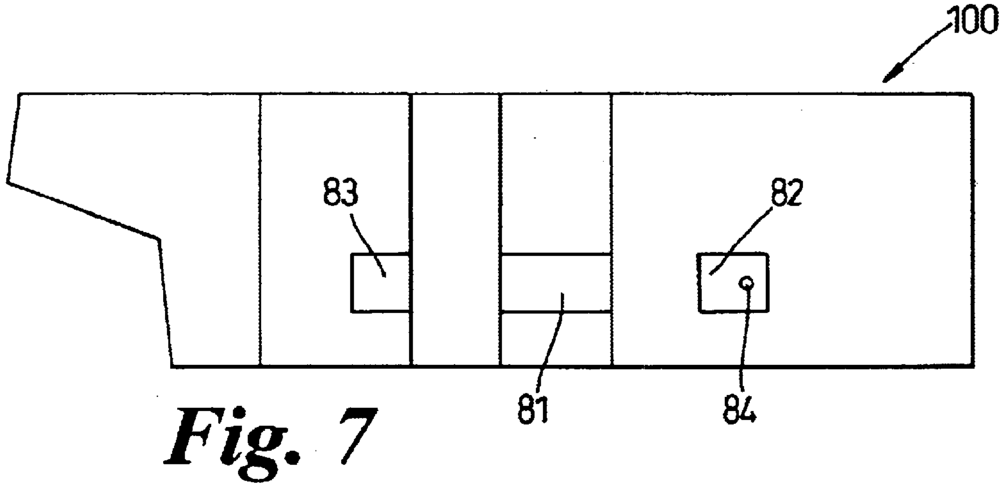
FIG. 7 is a top view, on a reduced scale, of the printer carriage mounting for the bushing of FIGS. 4 to 6.
Figure 8:
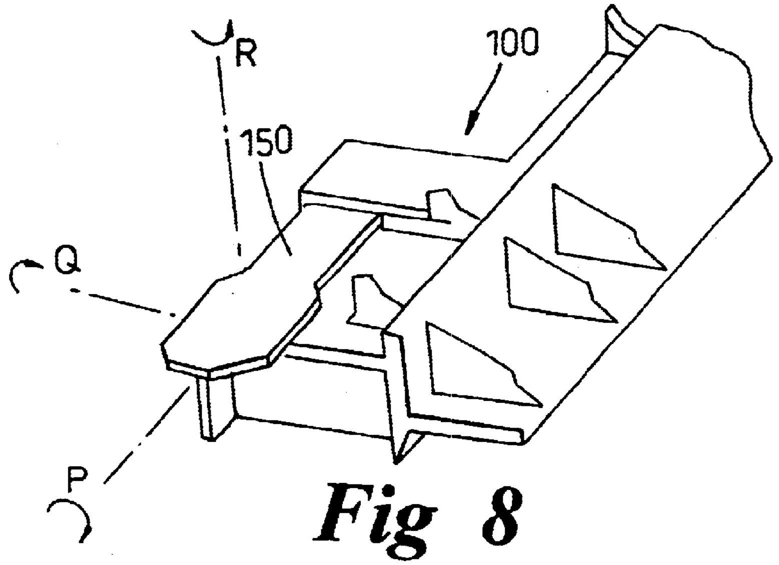
FIG. 8 shows a top perspective view, partly broken away, of the sliding arrangement of FIG. 3.

FIGS. 3, 7 and 8 show the part of printer carriage 100 arranged to receive the bushing 150. For clarity, arm 153 is omitted from FIGS. 3 and 8. The carriage 100 has a recess 81 which is rectangular in plan view but the surface of which forms part of a concave sphere. This surface is polished smooth. Longitudinally spaced from recess 81 are further rectangular recesses 82 and 83 of which recess 82 has a circular pin 84 projecting from the base.

During assembly, portion 65 is inserted in recess 81, hook portion 76 and end portion 73 are respectively inserted in recesses 83 and 82, and hole 74 is passed over pin 84. The bushing is now attached to the carriage 100. The carriage is then attached to the beam 32 so that the sliding surface 54 of bushing 150 is urged upwardly by spring 29 against the bottom surface of flange 48. Arm 153 now ceases to have any function, since it serves only to prevent the bushing being displaced during assembly.

FIG. 8 shows the three theoretical axes of rotation P, Q and R of the bushing 150 relative to the carriage 100. In order to allow all the surface regions 56–59 to be flat on the bottom surface of flange 48, rotation is allowed about axes P and Q. The shape and resilient nature of arm 152, in the form of a leaf spring, permits such rotations and the load on the bushing is such as to tend to maintain surface regions 56–59 flat on the flange.

The engagement of hole 74 with pin 84, however prevents rotation about the axis R which would produce undesired movement of the carriage 100 relative to beam 32.

Displacement of bushing 150 in the longitudinal direction of arm 152 is prevented, not by hole 74 which is elongate in this direction, but by the part-spherical portion 65 which would have to be moved bodily against the loading force of the carriage to permit such a displacement. Portion 65 also prevents lateral displacement of the bushing.

It can be seen from FIG. 2 that the shape of the front of beam 32 permits a close juxtaposition of the printhead 36, the slider rod 33, the encoder device 50 and the drive belts 71, 72. This permits a high degree of accuracy in controlling and detecting the spacing, angle and speed of the printhead 36 relative to the print medium and in maintaining a high print quality. Moreover, the belt 71, 72 is relatively close to the center of gravity 39 of the printer carriage. In addition, the above-mentioned components are arranged in front of beam 32 (i.e., between the levels of its top and bottom walls 41, 43) so that a vertically compact arrangement is provided. Moreover, the cross-sectional shape of beam 12 is such as to provide a satisfactory degree of stiffness. In addition, the upper surface of wall 41 is left clear so that it can form a convenient support for any trailing cables and/or ink supply tubing connected to carriage 100.

Further advantages of the above-described arrangement are:

- a better image quality, since the movement of carriage 100 is more accurate which is particularly advantageous in large format printers;
- key structural parts can be cheaper, since they do not need to be as accurate as in previous products; and
- because undesirable misalignment torques are smaller, the carriage preload can be lower, resulting in lower energy being required to move it, in smoother carriage movement, and in higher acceleration with the same motor.

An advantage of the bushing 150 is that it provides a uniform relatively large contact surface between beam 32 and carriage 100 to allow good control of the pen to paper spacing. The large surface area also enables high carriage loads to be supported without too high a pressure and reduces the effects of environmental dust. In addition, since the bushing is self-aligning, wear of the contact surfaces is very low. The configuration of arm 152 gives precisely the two out of three required rotational degrees of freedom.

Since the center of curvature of the surface portion 65 lies slightly above the sliding surface 54, the arrangement is highly stable under the influence of the friction force arising.

Various modifications can be made to the above-described arrangement. For example, the positions of the belt drive 71, 72 and the encoder device 50 may be interchanged. In another modification, belt drive 71, 72 can be moved away from front wall 45 or replaced by another form of carriage drive mechanism. Alternatively, encoder device 50 may be moved away from the front wall 45 or replaced by another form of detecting mechanism.

It will be noted that the shape of the rear and bottom walls 42, 43 is not important, but that the shapes illustrated are preferred since they contribute to the stiffness of the beam. Since the bottom wall 43 assists in defining a path for the print medium 49, the wall is preferably flat. It should be at a sufficient height above the plane B so that a straight path is provided for all thicknesses of print medium 49 which should not be bent.

The angle between walls 43 and 45 may lie within the range 25° to 75°, preferably 45° to 55°.

The slider rod 33 may be replaced by another device for guiding movement of the carriage 100 such as a rack and pinion mechanism.

The arrangement may be used in hardcopy devices other than printers. In addition, it can be used in reading devices, in which case printhead 36 is replaced by an optical or other scanner device, which can obviate the need for a separate encoder 50 to monitor position.

FIGS. 9 to 15 show embodiments with carriage beams having different cross-sectional shapes.

Figure 9:
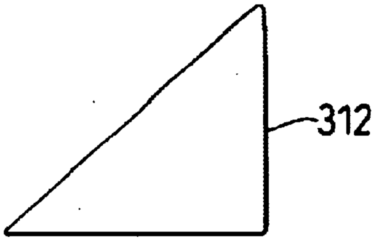
FIGS. 9 to 15 illustrate the cross-sectional shapes of the beams of seven alternative embodiments of the present invention.

FIG. 9 illustrates a generally-triangular sheet-metal beam 312. This has the required degree of stiffness, but does not have a surface equivalent to that of wall 41 to support trailing cables etc.

Figure 10:
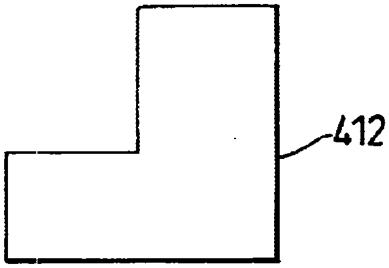

FIG. 10 illustrates a substantially L-shaped sheet metal beam 412. This does not provide such a vertically compact arrangement and the beam is not as stiff as in the preferred embodiment.

Figure 11:
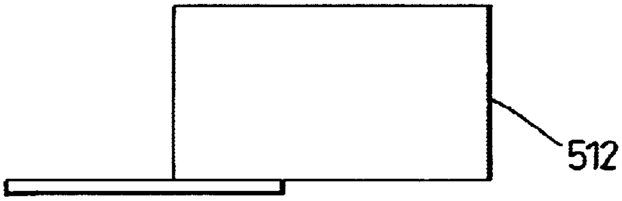

FIG. 11 illustrates another L-shaped beam 512 in which one arm of the beam is provided by a separate element attached thereto. This is more expensive to produce.

Figure 12:
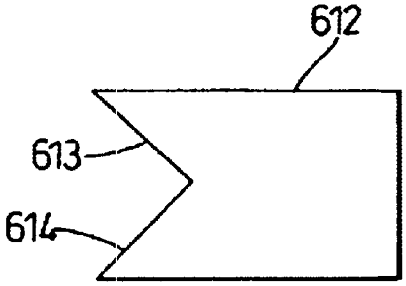

FIG. 12 illustrates a sheet metal beam 612 with a front wall having two inclined faces 613, 614 defining a V-shape. This is more expensive to produce and has an increased height compared to the preferred embodiment.

Figure 13:

FIG. 13 illustrates a sheet metal beam 712 with a further modified shape, but which does not provide such a high degree of stiffness.

Figure 14:
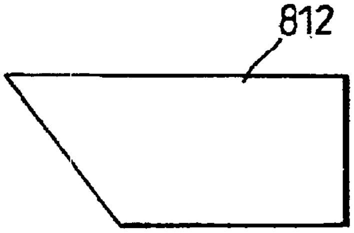

FIG. 14 illustrates a trapezoidal beam 812 which is an inverted version of that of FIG. 2. However, such a shape requires the beam to be in a higher position relative to the printhead, which increases the height of the printer.

Figure 15:
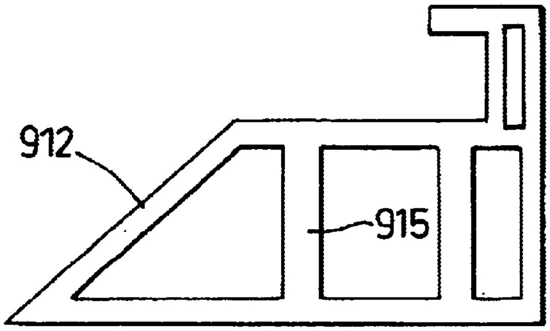

FIG. 15 illustrates an extruded beam 912 formed of aluminium. Internal stiffening members such as 915 can conveniently be provided during the extension process, so that an accurate beam is provided, although at a higher expense than sheet metal beams.

Various modifications may be made to bushing 150. For example arm 153 can be omitted. The center of curvature of the surface of portion 65 may be arranged to coincide with the plane of sliding surface 54 which causes the moment of the friction force to be zero; this, too, avoids unstable rotation of the bushing under the action of the friction force. The center of curvature may be even higher, but the degree of stability is not as satisfactory. The carriage 100 may be provided with a part-spherical convex projection instead of recess 81, in which case projection 65 on the bushing is replaced by a matching part-spherical concave recess.

The cross-sectional shape of arm 152 can be different, provided that it still permits rotation of portion 151 about the required axes and limits rotation about the third axis. The sides 67, 68 of portion 151 do not need to be truncated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A scanning device comprising:

a structural beam, said structural beam supporting:

a) a guide member fixedly attached to the beam.

b) a scanning head member moveably mounted on said guide member and operable to move parallel to a scanning plane, and c) a drive mechanism for moving said scanning head member, the beam having a plurality of faces including a first face, said first face being substantially parallel to said scanning plane, and an adjoining second face facing said guide member, wherein said second face comprises at least a first portion and a second portion, said first portion being closer to said guide member than said second portion, said second portion being set back from said first portion, and said drive mechanism being located in front of said second portion.

2. A scanning device according to claim 1, wherein at least part of said second face is inclined to said first face.

3. A scanning device according to claim 2, wherein substantially all of said second face is inclined to said first face.

4. A scanning device according to claim 2, wherein the angle of inclination lies within the range 25° to 75°.

5. A scanning device according to claim 1, wherein the beam has a third face extending generally parallel to said first face and adjoining an opposite edge of the second face.

6. A scanning device according to claim 1, comprising an encoder device arranged in front of said second portion of said second face.

7. A scanning device according to claim 1, wherein the drive mechanism comprises a drive belt arranged in front of said second portion of said second face.

8. A scanning device according to claim 7, comprising an encoder device arranged in front of said second portion of said second face, wherein the drive belt is arranged between the encoder device and said second portion of said second face.

9. A scanning device according to claim 1, wherein the guide member is a slider rod.

10. A scanning device comprising:

a structural beam, said structural beam supporting:

a) a guide member, fixedly attached to the beam, b) a scanning head member moveably mounted on said guide member and operable to move parallel to a scanning plane, and c) an encoder device for determining the position of said scanning bead member, the beam having a plurality of faces including a first face, said first face being substantially parallel to said scanning plane, and an adjoining second face facing said guide member, wherein said second face comprises at least a first portion, and a second portion, said first portion being closer to said guide member than said second portion, said second portion being set back from the first portion, and said encoder device being located in front of said second portion.

11. A scanning device according to claim 10, wherein at least part of said second face is inclined to said first face.

12. A scanning device according to claim 11, wherein substantially all of said second face is inclined to said first face.

13. A scanning device according to claim 11, wherein the angle of inclination lies within the range of 25° to 75°.

14. A scanning device according to claim 10, wherein the beam has a third face extending generally parallel to said first face and adjoining an opposite edge of the second face.

15. A scanning device comprising:

a structural beam, said structural beam supporting:

a) a guide member, b) a scanning head member moveably mounted on said guide member and operable to move parallel to a scanning plane, and c) a drive mechanism for moving said scanning head member, the beam having a plurality of faces including a first face, said first face being substantially parallel to said scanning plane, and an adjoining second face facing said guide member, wherein said second face comprises at least a first portion, said first portion being closest to said guide member, and a second portion, said second portion being set back from the first portion, and wherein the beam has a cross-sectional shape which defines a closed figure.

16. A scanning device according to claim 15, wherein the closed figure has substantially the shape of a trapezium.

17. A scanning device comprising:

a structural beam, said structural beam supporting:

a) a guide member, b) a scanning head member moveably mounted on said guide member and operable to move parallel to a scanning plane, and c) an encoder device for determining the position of said scanning head member, the beam having a plurality of faces including a first face, said first face being substantially parallel to said scanning plane, and an adjoining second face facing said guide member, wherein said second face comprises at least a first portion, said first portion being closest to said guide member, and a second portion, said second portion being set back from the first portion, and wherein the beam has a cross-sectional shape which defines a closed figure.

18. A scanning device according to claim 17, wherein the closed figure has substantially the shape of a trapezium.

19. A scanning device comprising:

a structural beam, said structural beam supporting:

a) a guide member, b) a scanning head member moveably mounted on said guide member and operable to move parallel to a scanning plane, and c) a drive mechanism for moving said scanning head member, the beam having a plurality of faces including a first face, said first face being substantially parallel to said scanning plane, and an adjoining second face facing said guide member, wherein said second face comprises at least a first portion, said first portion being closest to said guide member and a second portion, said second portion being set back from the first portion, and wherein the scanning head member is also movably mounted on a second guide member on the beam, the scanning head member having a bushing for sliding on said second guide member, the bushing comprising a portion having a part-spherical surface, which engages and can rotate in a limited manner relative to a corresponding surface to the scanning head member, and a flexible arm extending from the bushing portion and attached to a formation on the scanning head member.

20. A scanning device comprising:

a structural beam, said structural beam supporting:

a) a guide member, b) a scanning head member moveably mounted on said guide member and operable to move parallel to a scanning plane, c) an encoder device for determining the position of said scanning head member, the beam having a plurality of faces including a first face, said first face being substantially parallel to said scanning lane, and an adjoining second face facing said guide member, wherein said second face comprises at least a first portion, said first portion being closest to said member, and a second portion, said second portion being set back from the first portion, and wherein the scanning head member is also movably mounted on a second guide member on the beam, the scanning head member having a bushing for sliding on said second guide member, the bushing comprising a portion having a part-spherical surface, which engages and can rotate in a limited manner relative to a corresponding surface to the scanning head member, and a flexible arm extending from the bushing portion and attached to a formation on the scanning head member.

21. A hardcopy apparatus comprising:

a structural beam having a first face and a second face, said first face being substantially parallel to a scanning plane, and said second face facing a guide member, said guide member being attached to said structural beam; and a scanning head member moveably mounted on said guide member and operable to move parallel to said scanning plane;

wherein substantially all of said second face is inclined to said first face; and wherein the scanning head member is movably mounted on a second member on the structural beam, the scanning head member having a bushing for sliding on said second guide member, the bushing comprising a portion having a part-spherical surface, which engages and is configured to rotate in a substantially limited manner relative to a corresponding surface of the scanning head member, and a flexible and extending from the bushing portion and attached to a formation on the scanning head member.

22. The hardcopy apparatus according to claim 21, further comprising: a drive mechanism for moving said scanning head member.

23. The hardcopy apparatus according to claim 22, wherein the drive mechanism comprises a drive belt arranged in front of said second face.

24. The hardcopy of apparatus of claim 21, further comprising:

an encoder device for determining the position of said scanning head member relative to said structural beam, wherein said encoder device is arranged in front of said second face.

25. A hardcopy apparatus comprising:

a structural beam having a first face and a second face, said first face being substantially parallel to a scanning plane, and said second face facing a guide member;

said guide member being attached to said structural beam;

a scanning head member movably mounted on said guide member and operable to move parallel to said scanning plane;

a drive mechanism for moving said scanning head member; said drive mechanism including a drive belt arranged in front of said second face; and an encoder device for determining the position of said scanning bead member relative to said structural beam, wherein said encoder device is arranged in front of said second face;

wherein at least part of said second face is inclined to said first face; and wherein the scanning head member is movably mounted on a second guide member on the structural beam, the scanning head member having a bushing for sliding on said second guide member, the bushing comprising a portion having a part-spherical surface, which engages and is configured to rotate in a substantially limited manner relative to a corresponding surface of the scanning head member, and a flexible aim extending from the bushing portion and attached to a formation on the scanning head member.

26. The hardcopy apparatus according to claim 25, wherein the angle of inclination between said at least part of said second face and said first face lies with the range of 25° to 75°.

* * * * *